(12) United States Patent
Richer et al.

(10) Patent No.: US 7,802,472 B1
(45) Date of Patent: Sep. 28, 2010

(54) RUGGEDIZED SENSOR PROBE

(75) Inventors: Paul A. Richer, Everett, WA (US);
Brian Aikins, Everett, WA (US)

(73) Assignee: Fluke Corporation, Everett, WA (US)

( * ) Notice: Subject to any disclaimer, the term of this patent is extended or adjusted under 35 U.S.C. 154(b) by 258 days.

(21) Appl. No.: 11/842,885

(22) Filed: Aug. 21, 2007

(51) Int. Cl.
 *G01D 11/24* (2006.01)
(52) U.S. Cl. ........................................ 73/431; 73/866.4
(58) Field of Classification Search ................... 73/431, 73/866.4
 See application file for complete search history.

(56) References Cited

U.S. PATENT DOCUMENTS

| | | | | |
|---|---|---|---|---|
| 3,427,862 | A * | 2/1969 | Hubner ........................ | 73/23.2 |
| 3,559,049 | A * | 1/1971 | Liebermann et al. ........ | 324/464 |
| 3,999,440 | A * | 12/1976 | Kain ........................... | 73/431 |
| 4,098,653 | A * | 7/1978 | Kita et al. ................... | 205/784 |
| 4,444,990 | A * | 4/1984 | Villar ......................... | 136/221 |
| 4,656,863 | A * | 4/1987 | Takami et al. .............. | 73/31.05 |
| 4,660,407 | A * | 4/1987 | Takami et al. .............. | 73/31.05 |
| 4,899,586 | A * | 2/1990 | Koneval et al. ............. | 73/431 |
| 5,363,690 | A * | 11/1994 | Evangelista et al. ........ | 73/31.05 |
| 5,396,796 | A * | 3/1995 | Kotani et al. ................ | 73/431 |
| 5,463,375 | A * | 10/1995 | Bauer ......................... | 340/517 |
| 5,729,207 | A * | 3/1998 | Yamano ...................... | 340/628 |
| 6,085,576 | A * | 7/2000 | Sunshine et al. ........... | 73/29.01 |
| 6,297,723 | B1 * | 10/2001 | Shoji et al. .................. | 338/28 |
| D460,923 | S * | 7/2002 | Chen .......................... | D10/52 |
| 6,447,342 | B1 * | 9/2002 | Lawlyes et al. ............. | 439/686 |
| 6,553,813 | B2 * | 4/2003 | Rynhart et al. ............. | 73/73 |
| 7,121,722 | B2 * | 10/2006 | Hanzawa et al. ........... | 374/185 |
| 7,180,594 | B2 * | 2/2007 | Williams .................... | 356/436 |
| 7,415,877 | B2 * | 8/2008 | Okumura et al. ............ | 73/431 |
| 7,541,587 | B2 * | 6/2009 | Cutler et al. .......... | 250/339.13 |
| 2002/0029966 | A1 * | 3/2002 | Nelson et al. ............... | 204/426 |
| 2002/0040599 | A1 * | 4/2002 | Holleboom ................. | 73/431 |
| 2002/0177341 | A1 * | 11/2002 | Stein et al. .................. | 439/260 |
| 2005/0169347 | A1 * | 8/2005 | Kuo ........................... | 374/121 |
| 2006/0096862 | A1 * | 5/2006 | Benton ....................... | 204/431 |
| 2006/0243027 | A1 * | 11/2006 | Nelson et al. .............. | 73/23.31 |
| 2006/0288806 | A1 * | 12/2006 | Nelson ....................... | 73/866.5 |
| 2007/0131021 | A1 * | 6/2007 | Khadkikar et al. ......... | 73/31.02 |
| 2007/0237205 | A1 * | 10/2007 | Hayashi ...................... | 374/163 |
| 2008/0169934 | A1 * | 7/2008 | Lang et al. .................. | 340/632 |
| 2009/0020425 | A1 * | 1/2009 | Yamada ...................... | 204/426 |

* cited by examiner

*Primary Examiner*—David A. Rogers
(74) *Attorney, Agent, or Firm*—Christensen O'Connor Johnson Kindness PLLC

(57) ABSTRACT

A probe assembly for an instrument of the type having a housing is disclosed. The probe assembly includes a body having an anchor end for attaching to the housing and a sensor end, wherein at least a portion of the body is formed of an elastically deformable material. The probe assembly also includes a sensor assembly at the sensor end with a protective cap that protects the sensor assembly from impact and permits the sensor assembly to be in direct contact with the environment surrounding the probe assembly. The probe assembly further includes a signal cable assembly having a connector for coupling the sensor assembly to the instrument. The probe assembly also includes a pliant plug for facilitating the coupling of the connector with the sensor assembly, wherein the flexible plug thermally insulates the sensor.

29 Claims, 3 Drawing Sheets

RUGGEDIZED SENSOR PROBE

BACKGROUND

Advancements in electronics, especially in digital electronics and communications, have resulted in wide availability and use of mobile instrumentation. Mobile instruments are used in a variety of industrial and business applications. For example, utility companies use data entry terminals to enter utility data, such as readings from gas and electrical meters at points of use. As another example, transportation and wholesale services use handheld terminals to enter data related to services they provide, such as delivery address and customer name and signature.

Another area where mobile instruments and devices are used is industrial and technical fields. Many technical mobile instruments include a sensor of some sort to measure some physical quantity such as voltage, current, pressure, temperature, and humidity. Sensors may include circuits that are embedded within the mobile instrument, such as an ammeter used to measure current and voltage. Other sensors comprise independent devices coupled with the mobile instrument, such as thermistors used to measure temperature.

The mobile nature of such instruments often requires particular ruggedness to cope with various environmental factors, such as impact, abrasion, humidity, and extremes of hot and cold temperatures. For example, an industrial measurement instrument may fall on hard surfaces from a distance of a few inches to a few feet during normal operation. Accordingly, various ruggedized instruments and instrument casings have been devised to cope with the extra wear and tear in the field. Some of the above-noted industrial instruments that have internal sensor devices include probes that extend out from the industrial instrument to make measurements. For example, an ammeter that has current and voltage sensors implemented as internal circuits for measuring current and voltage may include probes that extend outwardly from the ammeter. In such instruments, the sensor device is protected because it is encased within the industrial measurement instrument rather than within the probe. In other industrial measurement instruments, however, the nature of the measurement is such that the sensor device needs to be located outside the confines of the industrial measurement instrument. For example, temperature and humidity sensors need to be in direct contact with air or other gasses, the temperature or humidity of which is being measured. In such instruments, the sensor device often is mounted in a probe and, thus, is particularly vulnerable because it is not encased within the body of the industrial measurement instrument. Such sensors require additional protection against physical impact and other environmental hazards.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the invention, a probe assembly for an instrument of the type having a housing is disclosed. The probe assembly includes a body having an anchor end for attaching to the housing and a sensor end, wherein at least a portion of the body is formed of an elastically deformable material. The probe assembly also includes a sensor assembly at the sensor end with a protective cap that protects the sensor assembly from impact and permits the sensor assembly to be in direct contact with the environment surrounding the probe assembly. The probe assembly further includes a signal cable assembly having a connector for coupling the sensor assembly to the instrument.

According to another aspect of the invention, a gas measurement system is disclosed. The gas measurement system includes a meter for analyzing gas properties. The meter includes a housing that couples with a probe assembly. The probe assembly includes a body having an anchor end for attaching to the housing and a sensor end. At least a portion of the body is formed from an elastically deformable material. A sensor assembly is positioned at the sensor end and includes a protective cap that protects the sensor assembly from impact and permits the sensor assembly to be in direct contact with the surrounding environment. The probe assembly includes a signal cable assembly having a connector for coupling the sensor assembly to the instrument. The probe assembly also includes a pliant plug for facilitating the coupling of the connector with the sensor assembly, wherein the pliant plug thermally insulates the sensor.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The presently claimed subject matter is described herein with reference to the accompanying illustrations where like numerals correspond to like elements. In one exemplary embodiment, a ruggedized probe that is constructed in accordance with the invention is attached to an industrial measurement instrument for sensing and measuring various physical quantities. A sensor device may be located at the sensor end of the probe, which may be an outward end of the probe with respect to the point of attachment of the probe with the industrial measurement instrument, and may be exposed to the surrounding environment, such as air, via openings in the probe. Typically, the sensor device is in signal communication with the industrial measurement instrument using a cable assembly. For example, the sensor device may be electrically or optically coupled to the industrial measurement instrument. Preferably, the body of the ruggedized sensor probe is flexible, allowing the body of the probe to flex in response to an impact force, and thus, deflecting and dissipating the impact force. As noted above, the sensor end of the probe may be perforated to allow direct and free exposure of the sensor device to the surrounding gas, such as air, providing, at the same time, a minimal thermal mass to prevent interference with the function of the sensor device, such as measurement of surrounding temperatures.

Figure 1:
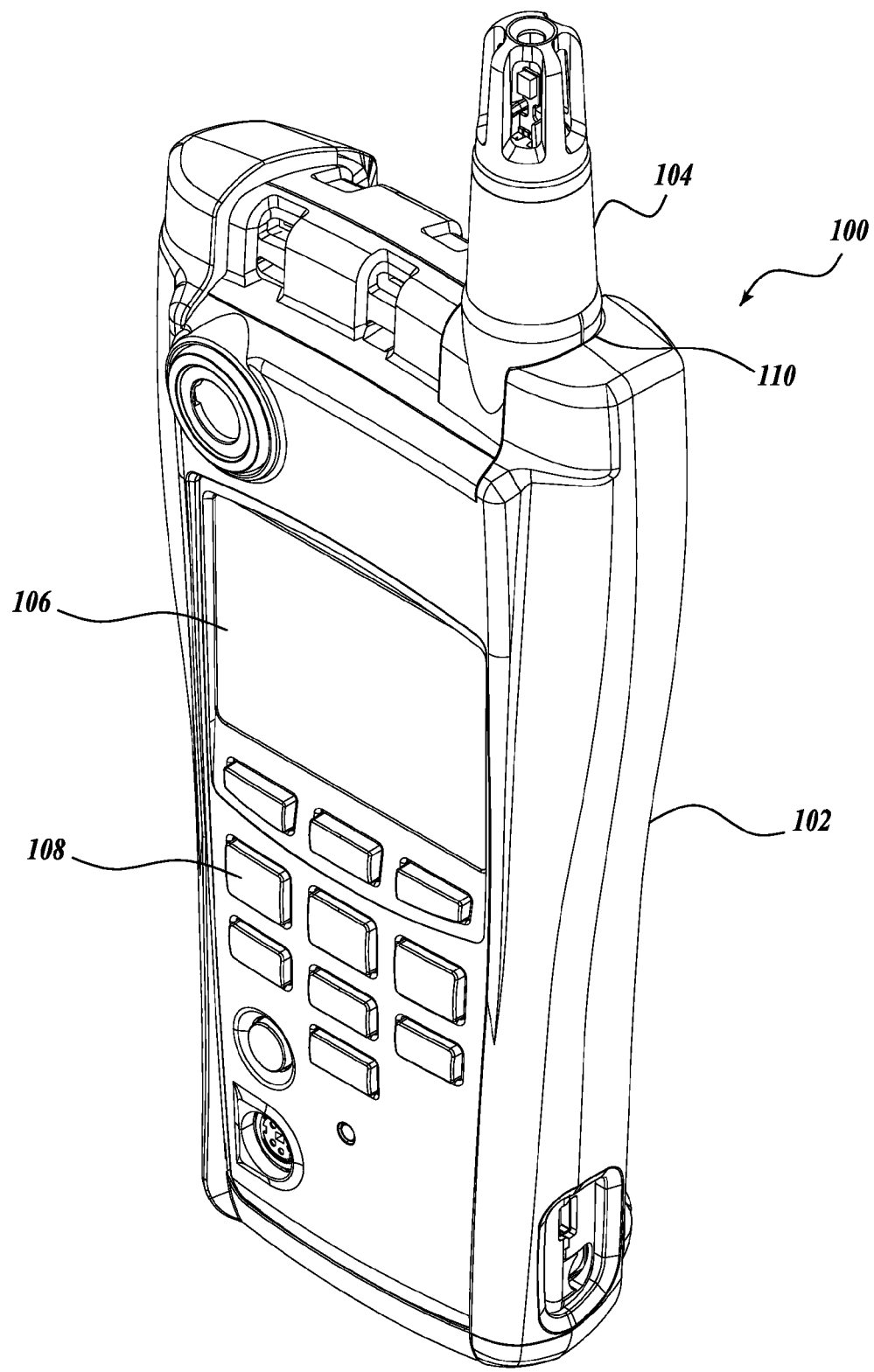
FIG. 1 is a pictorial diagram of an industrial measurement system having an external sensor probe.

In FIG. 1, a pictorial diagram of an industrial measurement system 100 is shown including an industrial measurement instrument 102 and a ruggedized sensor probe 104. In the depicted arrangement, the industrial measurement instrument 102 is a hand-held terminal with a screen 106, which may be touch-sensitive, in one illustrative embodiment, for display of information and user data entry, a keyboard 108 or other user input means, such as a microphone for voice commands, and at least one sensor interface or port 110 for coupling the industrial measurement instrument 102 with a sensor device, that is located in the ruggedized sensor probe 104. In one exemplary embodiment, the ruggedized sensor probe 104 is permanently attached to the industrial measurement instrument 102. In another exemplary embodiment, the ruggedized sensor probe 104 is a separate component that is detachably coupled to the industrial measurement instrument 102. In yet another exemplary embodiment, the ruggedized sensor probe 104 may be manufactured as an integral part of the casing or housing of the industrial measurement instrument 102. In an embodiment in which the ruggedized sensor probe 104 is a separate component, the probe may be manufactured as a single piece or multiple pieces of material. The ruggedized sensor probe 104 may be attached to the industrial measurement instrument 102 by means of an external fastener, such as an integral clamp incorporated in the casing of the industrial measurement instrument 102 or the sensor probe 104. Other means of attaching the ruggedized sensor probe 104 to the industrial measurement instrument 102 are described below with respect to FIG. 2.

A ruggedized sensor assembly with replaceable and/or exchangeable components can provide various advantages, such as flexibility of function for the industrial measurement system 100. In one exemplary embodiment, the ruggedized sensor probe 104 comprises an assembly of various components coupled to each other to form the ruggedized sensor probe 104. For example, the ruggedized sensor probe 104 may comprise a body having two ends, one end for coupling to the industrial measurement instrument 102 and the other end for receiving a sensor assembly. The sensor assembly in turn may include a sensor end coupled with a sensor cap to protect the sensor device. In this embodiment, different components of the ruggedized sensor probe may be replaced if damaged. Additionally, the sensor device may be interchanged with other sensor devices for measurement of different physical quantities. For instance, one sensor device may be used to measure temperature, while another sensor device may be used to measure humidity.

Figure 2:
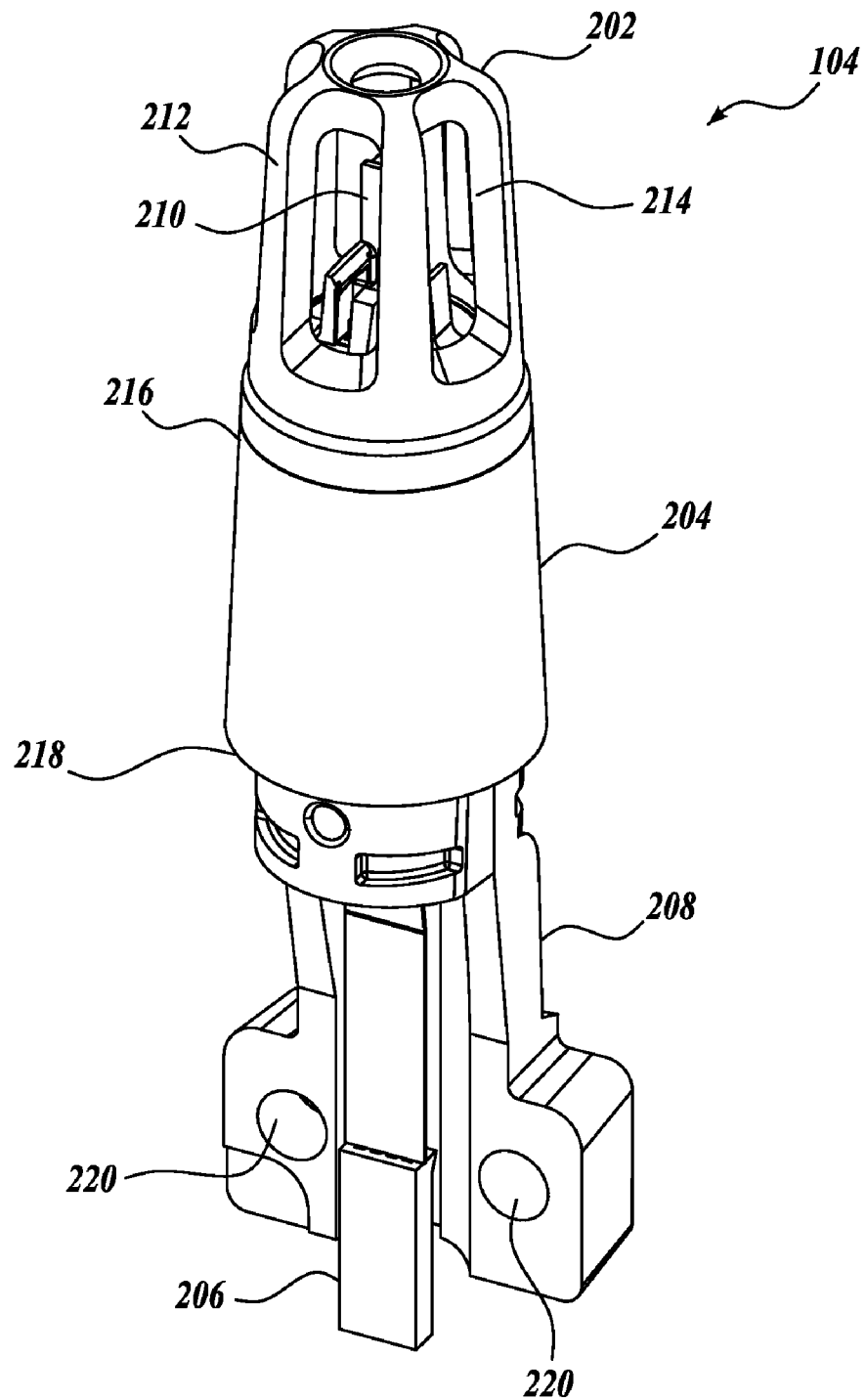
FIG. 2 is a pictorial diagram of a ruggedized probe assembly used with the industrial measurement system of FIG. 1.

An exemplary modular ruggedized sensor probe is depicted in FIG. 2. The ruggedized sensor probe 104 comprises a body 204 attached at one end to a coupling base 208 and at the other end to a protective sensor cap 202. In the depicted embodiment, the body 204 is elongated with a sensor end 216 and an anchor end 218. Preferably, the body 204 is relatively flexible being made with a pliant elastomeric material so that the body 204 elastically deforms in response to an impact force, thus dissipating the force of deformation and protecting the ruggedized sensor probe 104. The coupling base 208 extends downwardly from the anchor end 218 and is used as an anchor to couple the ruggedized sensor probe 104 to the industrial measurement instrument 102. In the arrangement of FIG. 2, the coupling base 208 includes holes 220 that extend through the coupling base 208. The holes 220 are used to couple the coupling base 208 to the casing of the industrial measurement instrument 102, using fasteners, such as bolts or screws. Alternatively, the coupling base 208 may include threads that peripherally surround the coupling base 208, thus allowing the ruggedized probe 104 to be installed in a sensor port 110 that includes matching threads. As an additional alternative, the coupling base 208 may be bonded to the sensor port 110 using conventional bonding techniques. Such bonding techniques include the use of adhesives, hot gas welding, contact welding, hot plate welding, high frequency welding (using electromagnetic waves), ultrasonic welding, or vibration welding to fuse the coupling base 208 and sensor port 110 together.

In one exemplary embodiment, the cap 202 is an integral part of the body 204. Alternatively, the sensor cap 202 is a separate component attachable to the body 204. For example, the sensor cap 202 may be a threaded component that may be screwed on to the body 204. Similarly, the coupling base 208 may be a distinct component or it may be an integral part of the body 204. For example, the coupling base 208 may be a threaded component that is screwed onto the body 204. In another alternative, the base 208 and the sensor cap 202 is coupled with the body 204 using an adhesive.

A cable assembly 206 is provided, which couples a sensor device 210 to the industrial measurement instrument 102 for transmitting signal information from the sensor 210 to the industrial measurement instrument 102. The cable assembly 206 may be a distinct component coupled with the sensor 210 using a connector. In one exemplary embodiment, the cable assembly 206 is integrated with the sensor 210, forming a single sensor and cable assembly. Alternatively, the cable assembly 206 may be a distinct component from the coupling base 208 and body 204 or the cable assembly 206 may be an integral part of the coupling base 208 and body 204 subassembly. The ruggedized sensor probe 104 thus configured may be coupled with the industrial measurement instrument 102 using the coupling base 208 to form the industrial measurement system 100.

Figure 3:
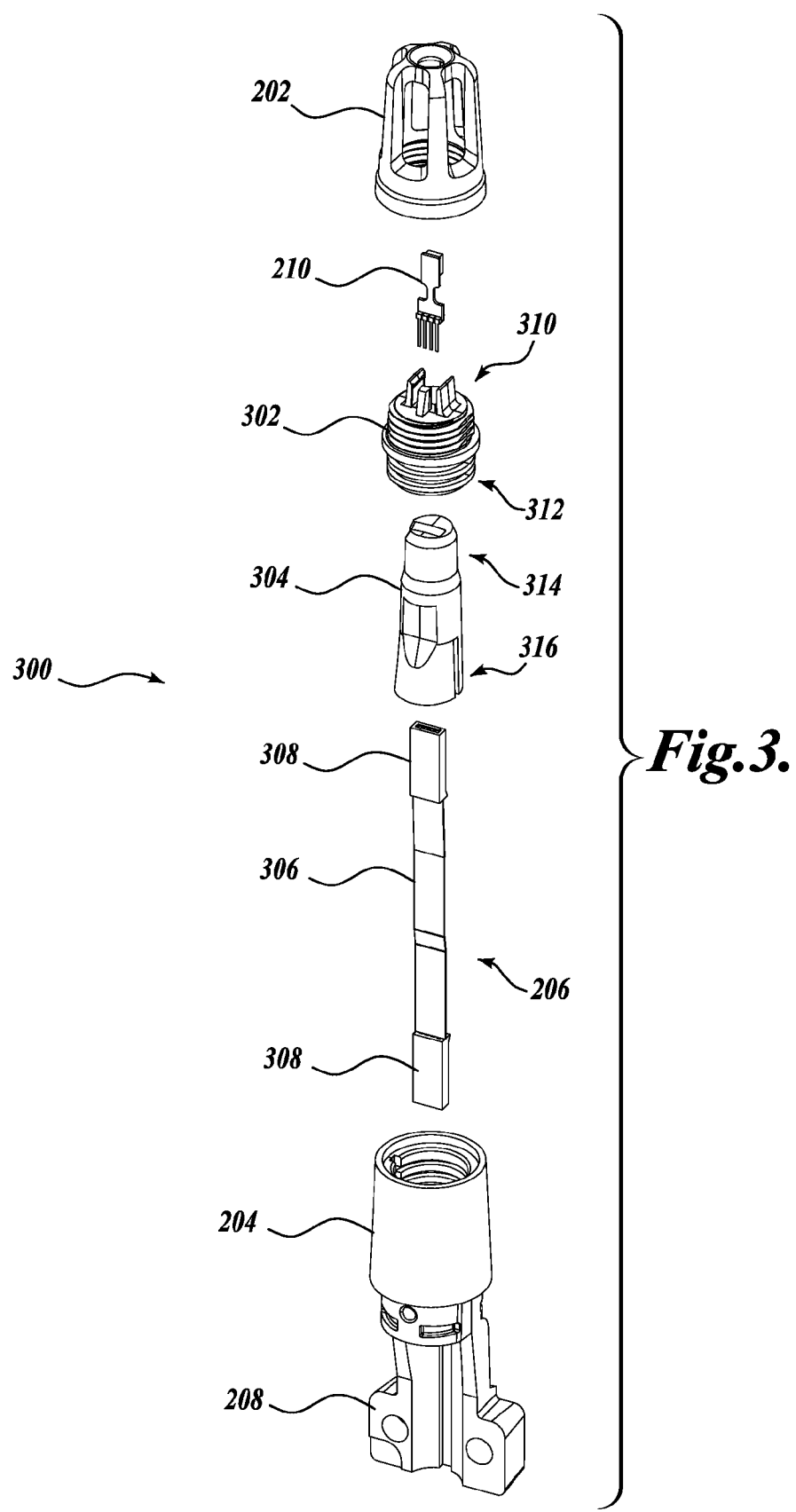
FIG. 3 is a partially exploded perspective view of the ruggedized sensor assembly depicted in FIG. 2.

FIG. 3 depicts a partially exploded view of an exemplary embodiment of the ruggedized sensor probe. The exemplary exploded view shown in FIG. 3 depicts discrete components assembled to form the ruggedized sensor probe 300. In one exemplary embodiment, the body 204 is a threaded component having threads on both ends. At one end, the coupling base 208 is threaded onto the body. At the other threaded end of the body 204, a sensor base 302 may be attached. The sensor base 302 is used as a base for the sensor 210. In this embodiment, the sensor base 302 forms a threaded platform for holding the sensor 210. The depicted sensor base 302 includes a sensor-side threaded section 310 for coupling with the sensor cap 202, and a body-side threaded section 312 for coupling with the body 204. Those skilled in the art will appreciate that the sensor base 302 may be coupled to the sensor cap 202 and the body 204 using any number of industry-recognized methods, such as those enumerated for coupling the coupling base 208 to the sensor port 110 described with respect to FIG. 2. The sensor base 302 is thus operable to receive different types of sensor devices 210. For example, the sensor device 210 may be a temperature sensor or a humidity sensor. The sensor devices 210 may also vary according to the range of physical quantities the sensor can measure. For example, a temperature sensor may be operable to measure temperatures between −20° F. to 200° F., while another temperature sensor may be operable to measure temperatures in the range of hundreds of degrees Fahrenheit.

The modular subassembly of the ruggedized sensor probe 300 provides flexibility to use different sensors for different applications, as appropriate. In the exemplary embodiment depicted in FIG. 3, the cable assembly 206 includes two connectors 308 and a cable 306 to electrically couple the sensor device 210 to the industrial measurement instrument 102 through the body 204 and coupling base 208. In this embodiment, the cable assembly 206 includes a separate cable 306 attached to connectors 208 on both sides of the cable 206. Alternatively, the cable assembly 206 may include an integrated flexible circuit having conductive traces. As another alternative, the conductive traces connecting the sensor 210 to the industrial measurement instrument 102 may be embedded in the sensor base 203, the body 204, and the coupling base 208 such that when the aforementioned components are coupled together, electrical connections are established between the sensor 210 and the industrial measurement instrument 102.

The modular configuration of the ruggedized sensor probe 300 enables the replacement of the cable assembly due to damage or normal wear. The cable assembly may also be exchanged with other cable assemblies suitable for use with different types of sensor devices 210. In one exemplary embodiment, a plug component 304 may be used to couple the connector 308 with the sensor device 210 through the sensor base 302. The plug component 304 may also be used to thermally isolate the sensor device 210 from the heat generated by the industrial measurement instrument 102. In configurations such as those in which temperature is sensed, it is important to maintain the integrity of data collected by the sensor device 210, by preventing interference from heat generated by sources, such as the industrial measurement instrument 102, other than the intended source of heat, such as air, the temperature of which is to be measured.

In one exemplary embodiment, the sensor cap 202 includes longitudinal slots 214 (FIG. 2) that are separated by longitudinal ribs 212 to provide free flow of gases over the sensor device 210, to facilitate measurement of gas properties, such as temperature and humidity. In another exemplary embodiment, the sensor cap 202 may include holes on the surface of the sensor cap 202 to expose the sensor device 210 to the external environment. In yet another illustrative embodiment, the sensor cap may include a porous mesh or fabric.

In one exemplary embodiment, the sensor cap 202 comprises a hard plastic to protect the sensor device 210 from impact forces. The sensor cap 202 also prevents the sensor device 210 from directly contacting objects, that may cause dislodging of the sensor device 210 from the sensor base 302 and losing electrical connection, and therefore data transmission, to the industrial measurement device 102.

The sensor cap 202 may be composed of material with minimal thermal mass to allow the sensor device 210 to measure physical quantities, such as temperature, without interference from other thermal sources, such as heat stored in the sensor cap material. Similarly, the sensor cap 202 may comprise material that reduce condensation on the sensor cap 202, thus preventing interference with the accurate measurement of humidity by the sensor device 210.

The sensor device 210 may comprise a single integrated device, in one exemplary embodiment. In another exemplary embodiment, a portion of the sensor device 210 may be disposed within the industrial measurement instrument 102 and another portion of the sensor device 210 may be disposed within the ruggedized sensor probe, thus, forming a distributed sensor device assembly. The different parts of such sensor device assembly may communicate with each other using the cable assembly 206, or other means, such as optical fibers or wireless transmission. Those skilled in the art will appreciate that other sensor device assembly configurations are possible without departing from the spirit of the present disclosures.

The plug component 304 may serve multiple purposes, as briefly indicated above. In one exemplary embodiment, the plug component 304 thermally isolates the sensor device 210 from the heat generated by the industrial measurement instrument 102. The plug component 304 may comprise a pliant material, such as rubber, that is located in the interior of the body 204 and encloses the cable assembly 206, as it passes through the body 204. Using the plug component formed of pliant material provides an effective seal that fills the void within the body 204 and tightly surrounds the cable assembly 206. In this embodiment, the cable assembly 206 passes through a slot that extends along the longitudinal axis of the plug component 304 for enclosing the cable assembly 206.

In another exemplary embodiment, the plug component 304 may have a conical shape with a tail end 316 and a head end 314 and may be used as a handling device to secure the cable assembly 206 while coupling the connector 308 to the sensor device 210. In this embodiment, the tail end 316 forms the large end of the conical section and the head end 314 forms the small end. This conical shape allows the plug component 304 to be pushed into the body 204, like a wedge, while enclosing the cable assembly 206, and effectively seal the opening of the body 204 facing the industrial measurement instrument 102. For example, the plug component 304 may be used to physically push the connector 308 to be coupled with the sensor device 210. The plug component 304 may also be used as a tool for guiding the cable assembly 206 and the connector 308 to make proper contact in the proper orientation with the sensor device 210. The larger tail end 316 of the plug may be used as a handle to push the plug component 304 and the enclosed cable assembly 206 into the body 204. This is important because when the ruggedized sensor probe is assembled, such as shown in FIG. 2, there is no access to the connector pins of sensor device 210. In this embodiment, the plug component 304 may include longitudinal or spiral grooves and/or ridges that fit together with matching ridges and/or grooves provided on the internal surface of the body 204. These ridges and/or grooves may be used to guide the plug component 304 into the body 204 during assembly and maintain the cable connector 308 in the installed position after the assembly of the sensor probe 300.

Those of skill in the art will appreciate that, as noted above, the components shown in FIG. 3 may be integrated together or further be componentized in any reasonable combination. For example, the cable assembly 206 and the plug component 304 may be formed together as a single integrated component. Similarly, the sensor cap 202, the sensor device 210, and the sensor base 302 may be integrated together to form a single component.

The ruggedized sensor probe 104 protects the sensor device 210 from physical impact as well as from interference of parasitic thermal and humidity sources. As noted above, protection of the sensor device 210 from physical impact force is provided by the elastic properties of the body 204 and the rigidity of the sensor cap 202. The body 204 elastically deforms and deflects impact force, thus reducing the force experienced by the sensor device 210. Additionally, the sensor cap 202 protects the sensor device 210 from parasitic thermal and humidity interference by providing the rigid perforated structure having low thermal mass and being resistant to condensation, surrounding the sensor device 210, in some of the noted embodiments. The sensor cap 202 may also comprise a flexible but firm structure to protect the sensor device 210 from physical impact and parasitic thermal and humidity interference.

While illustrative embodiments have been illustrated and described, it will be appreciated that various changes can be made therein without departing from the spirit and scope of the invention.

The invention claimed is:

1. A probe assembly for an instrument of the type having a housing, the probe assembly comprising:

(a) a body having an anchor end adapted to be attached to the housing and a sensor end, wherein at least a portion of the body is formed of an elastically deformable material;

(b) a sensor assembly at least a portion of which is positioned at the sensor end, wherein the sensor end protects the at least a portion of the sensor assembly from impact and permits the sensor assembly to be in fluid communication with an environment surrounding said probe assembly;

(c) signal cable assembly having a connector for coupling the sensor assembly to the instrument; and (d) a separable pliant plug for use in the coupling of the connector with the sensor assembly, wherein the pliant plug at least partially thermally isolates the sensor from the instrument and provides a seal between the probe assembly and the housing.

2. The probe assembly of claim 1, wherein the sensor assembly comprises a temperature sensor.

3. The probe assembly of claim 1, wherein the sensor assembly comprises a humidity sensor.

4. The probe assembly of claim 1, wherein the signal cable assembly is integrated with a pliant plug.

5. The probe assembly of claim 1, wherein the flexible plug is used to guide the signal cable assembly to couple with the sensor assembly.

6. The probe assembly of claim 1, wherein the body is threaded at the anchor end to receive a coupling base component.

7. The probe assembly of claim 6, wherein the coupling base component is operable to couple the probe assembly to the instrument.

8. The probe assembly of claim 1, wherein the body is threaded at the sensor end to receive a sensor base.

9. The probe assembly of claim 8, wherein the sensor base is configured to retain at least a portion of the sensor assembly.

10. The probe assembly of claim 1, wherein the sensor end comprises a sensor cap.

11. The probe assembly of claim 10, wherein the sensor cap comprises a rigid structure.

12. The probe assembly of claim 11, wherein the sensor cap further comprises ribs.

13. The probe assembly of claim 12, wherein the ribs are separated to form a plurality of openings between the ribs.

14. The probe assembly of claim 10, wherein the body comprises an elastomeric material.

15. A gas measurement system comprising:

a meter operable to analyze gas properties, the meter including a housing operable to couple with a probe assembly; and a probe assembly coupled with the meter, the probe assembly including:

(a) a body having an anchor end adapted to be attached to the housing and a sensor end, wherein at least a portion of the body is formed from an elastically deformable material;

(b) a sensor assembly at least a portion of which is positioned at the sensor end, wherein the sensor end protects the at least a portion of the sensor assembly from impact and permits the sensor assembly to be in fluid communication with a surrounding environment of said probe assembly;

(d) a signal cable assembly having a connector for coupling the sensor assembly to the instrument; and (e) a separable pliant plug for facilitating the coupling of the connector with the sensor assembly, wherein the pliant plug at least partially thermally isolates the sensor from the meter and provides a seal between the probe assembly and the housing.

16. The system of claim 15, wherein the sensor assembly comprises a temperature sensor.

17. The system of claim 15, wherein the sensor assembly comprises a humidity sensor.

18. The system of claim 15, wherein the signal cable assembly is integrated with the pliant plug.

19. The system of claim 15, wherein the pliant plug is used to guide the signal cable assembly to couple with the sensor assembly.

20. The system of claim 15, wherein the anchor end is integrated with the housing.

21. The system of claim 15, wherein the body is threaded at the anchor end to receive a coupling base component.

22. The system of claim 21, wherein the coupling base component is operable to couple the probe assembly to the instrument.

23. The system of claim 15, further comprising a sensor base wherein the body is threaded at the sensor end to receive the sensor base.

24. The system of claim 23, wherein the sensor base is configured to retain at least a portion of the sensor assembly.

25. The system of claim 15, wherein the sensor end includes a sensor cap.

26. The system of claim 25, wherein the sensor cap comprises a rigid structure.

27. The system of claim 26, wherein the sensor cap further comprises ribs.

28. The system of claim 27, wherein the ribs are separated to form a plurality of openings between the ribs.

29. The system of claim 25, wherein the body comprises an elastomeric material.

* * * * *